(12) United States Patent
Laskaris et al.

(10) Patent No.: US 9,640,308 B2
(45) Date of Patent: May 2, 2017

(54) HIGH TEMPERATURE SUPERCONDUCTING MAGNET

(75) Inventors: Evangelos Trifon Laskaris, Schenectady, NY (US); James Pellegrino Alexander, Ballston Lake, NY (US); Kiruba Sivasubramaniam, Clifton Park, NY (US); Tao Zhang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1804 days.

(21) Appl. No.: 12/287,813

(22) Filed: Oct. 14, 2008

(65) Prior Publication Data

US 2010/0089073 A1    Apr. 15, 2010

(51) Int. Cl.
| | |
|---|---|
| *F25B 19/00* | (2006.01) |
| *H01F 6/04* | (2006.01) |
| *H02K 9/00* | (2006.01) |
| *H02K 41/00* | (2006.01) |
| *H02K 1/22* | (2006.01) |
| *F25D 15/00* | (2006.01) |
| *F17C 13/00* | (2006.01) |
| *H02K 3/00* | (2006.01) |

(52) U.S. Cl.
CPC ............... *H01F 6/04* (2013.01); *F17C 13/00* (2013.01); *F25B 19/00* (2013.01); *F25D 15/00* (2013.01); *H02K 1/22* (2013.01); *H02K 3/00* (2013.01); *H02K 9/00* (2013.01); *H02K 41/00* (2013.01)

(58) Field of Classification Search
CPC . H01F 6/04; H02K 41/00; H02K 1/22; H02K 3/00; H02K 9/00; F25B 19/00; F25D 15/00; F17C 13/00
USPC .... 62/51.1, 50.1, 50.2, 50.7, 45.1; 174/15.4; 250/352; 335/217; 505/825, 888, 892
See application file for complete search history.

(56) References Cited

U.S. PATENT DOCUMENTS

| | | | | | |
|---|---|---|---|---|---|
| 4,926,647 | A | * | 5/1990 | Dorri et al. | 62/51.1 |
| 5,032,869 | A | * | 7/1991 | Herd et al. | 335/216 |
| 5,668,516 | A | * | 9/1997 | Xu et al. | 335/216 |
| 6,748,749 | B2 | * | 6/2004 | Tsuda | 62/49.2 |
| 6,933,817 | B2 | * | 8/2005 | Reeves | 335/216 |
| 7,559,205 | B2 | * | 7/2009 | Atkins et al. | 62/51.1 |
| 2006/0207266 | A1 | * | 9/2006 | Belton et al. | 62/51.1 |
| 2007/0001521 | A1 | * | 1/2007 | Kruip et al. | 310/12 |
| 2008/0115510 | A1 | * | 5/2008 | Crowley et al. | 62/51.1 |
| 2008/0148756 | A1 | * | 6/2008 | Oomen et al. | 62/259.2 |
| 2008/0209919 | A1 | * | 9/2008 | Ackermann et al. | 62/51.1 |
| 2008/0271467 | A1 | * | 11/2008 | Gilgrass et al. | 62/51.1 |

* cited by examiner

*Primary Examiner* — Frantz Jules
*Assistant Examiner* — Webeshet Mengesha
(74) *Attorney, Agent, or Firm* — Pabitra K. Chakrabarti

(57) ABSTRACT

A high temperature superconducting (HTS) magnet coil disposed within a cryostat is configured with a thermo-siphon cooling system containing a liquid cryogen. The cooling system is configured to indirectly conduction cool the HTS magnet coil by nucleate boiling of the liquid cryogen that is circulated by the thermo-siphon in a cooling tube attached to a heat exchanger bonded to the outside surface of the HTS magnet coil. A supply dewar is configured with a re-condenser cryocooler coldhead to recondense boiloff vapors generated during the nucleate boiling process.

13 Claims, 3 Drawing Sheets

HIGH TEMPERATURE SUPERCONDUCTING MAGNET

BACKGROUND

The invention relates generally to superconducting magnets, and more particularly to a high temperature superconducting (HTS) magnet implemented via indirect thermal conduction cooling of the HTS coil using a heat exchanger shell that is bonded to a thermo-siphon cooling coil filled with boiling liquid cryogen.

Superconducting magnets are typically immersed in liquid cryogen to implement direct cooling of the superconducting magnet coils. The direct cooling is generally implemented by pool boiling of the liquid cryogen in contact with the magnet coils. The cryogen is typically contained in a large and heavy vessel surrounding the magnet. The liquid cryogen inventory required to fill the vessel and cool the magnet by direct boiling is large and expensive.

It would be advantageous to provide a superconducting magnet that overcomes the size, weight and cost constraints associated with typical superconducting magnets described above.

BRIEF DESCRIPTION

Briefly, in accordance with one embodiment, a high temperature superconducting (HTS) magnet comprises:

a HTS magnet coil disposed within a cryostat;

a thermo-siphon cooling system comprising a liquid cryogen, the cooling system configured to indirectly conduction cool the HTS coil by nucleate boiling of the liquid cryogen that is circulated by thermo-siphon in a cooling tube attached to a heat exchanger bonded to the outside surface of the HTS magnet coil; and a supply dewar comprising a re-condenser cryocooler coldhead configured to recondense boiloff vapors generated during the nucleate boiling process.

According to another embodiment, a high temperature superconducting (HTS) magnet comprises:

a HTS magnet coil comprising a heat exchanger bonded thereto;

a cooling system configured to indirectly conduction cool the HTS coil by nucleate boiling of a liquid cryogen that is circulated to the heat exchanger; and a cryocooler coldhead configured to recondense boiloff vapors generated during the nucleate boiling process to generate the boiling liquid cryogen.

According to yet another embodiment of the invention, a method of cooling a high temperature superconducting (HTS) magnet comprises:

providing a HTS magnet coil comprising a heat exchanger bonded thereto;

subjecting the heat exchanger to a boiling liquid cryogen to indirectly cool the HTS magnet coil via thermal conduction between the HTS magnet coil and the heat exchanger; and recondensing boiloff vapors generated via the thermal conduction process to generate a continuous supply of the boiling liquid cryogen.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
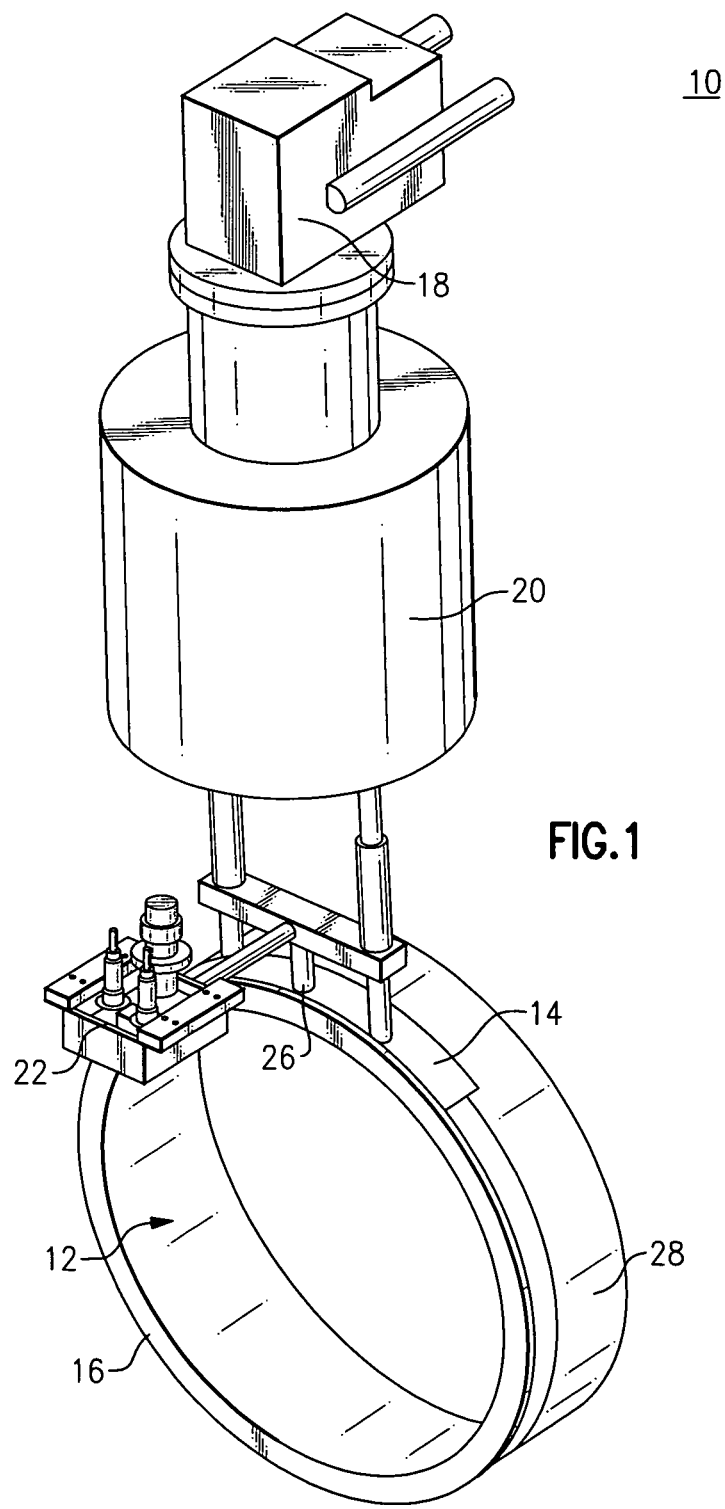
FIG. 1 is a pictorial diagram illustrating a high temperature superconducting (HTS) magnet assembly according to one embodiment of the invention.

FIG. 1 is a pictorial diagram illustrating a high temperature superconducting (HTS) magnet assembly 10 according to one embodiment of the invention. In the illustrated example arrangement, the magnet assembly 10 includes an HTS coil 12 having a copper heat exchanger shell 14 that may be a copper foil bonded to the outer surface of the HTS coil 12. The present invention is not so limited however, and it shall be understood that thermally conductive materials known to those skilled in the heat transfer art, other than copper, can be employed in accordance with the principles described herein. Other materials can include, without limitation, aluminum, aluminum alloys, or copper alloys. The copper heat exchanger shell 14 is also bonded to a thermo-siphon cooling coil 16 described in more detail below with reference to FIGS. 2 and 3.

The thermo-siphon cooling coil 16 is filled with a suitable boiling liquid cryogen such as Neon, for example, to provide indirect thermal conduction cooling of the HTS coil 12 via the copper heat exchanger shell 14. Other cryogens that can be used include, without limitation, nitrogen, hydrogen, and helium. The evaporated cryogen (e.g. Neon) is re-condensed remotely outside a coil cryostat 28 via a cryocooler coldhead 18 that is coupled to a supply dewar 20 having an inventory of cryogen. The size of inventory depends on the time of operation required to ride through power interruptions and outages, and may typically vary from 1 to 10 liters, according to some aspects of the invention. The HTS coil 12 and surrounding cryostat 28 advantageously provide a very lightweight compact superconducting magnet structure that is capable of withstanding high shock and vibration loads, with sufficient storage of cryogens to safely operate through power interruptions and outages.

The magnet assembly 10 also includes coil power leads 22, described in more detail below with reference to FIG. 3. The coil power leads 22 are heat stationed to the cryogen cooling tubes 32 and 34 depicted in FIGS. 2 and 3 outside the coil cryostat 28 through suitable high thermal conductivity electrical insulators 24 such as beryllium oxide ceramic insulators located in the diagonal space of the transverse blocks shown in FIG. 3 that connect the leads 22 to the tubes 32, 34). Other materials can include, without limitation, quartz crystals. The HTS coil 12 is thermally insulated and mechanically suspended inside the cryostat 28 by a composite thermal support 26, attached to the cryostat 28 at one end and to the HTS coil 12 at the other end. In a particular embodiment, the composite thermal support 26 comprises a thin cantilever fiber reinforced composite shell 26.

Figure 2:
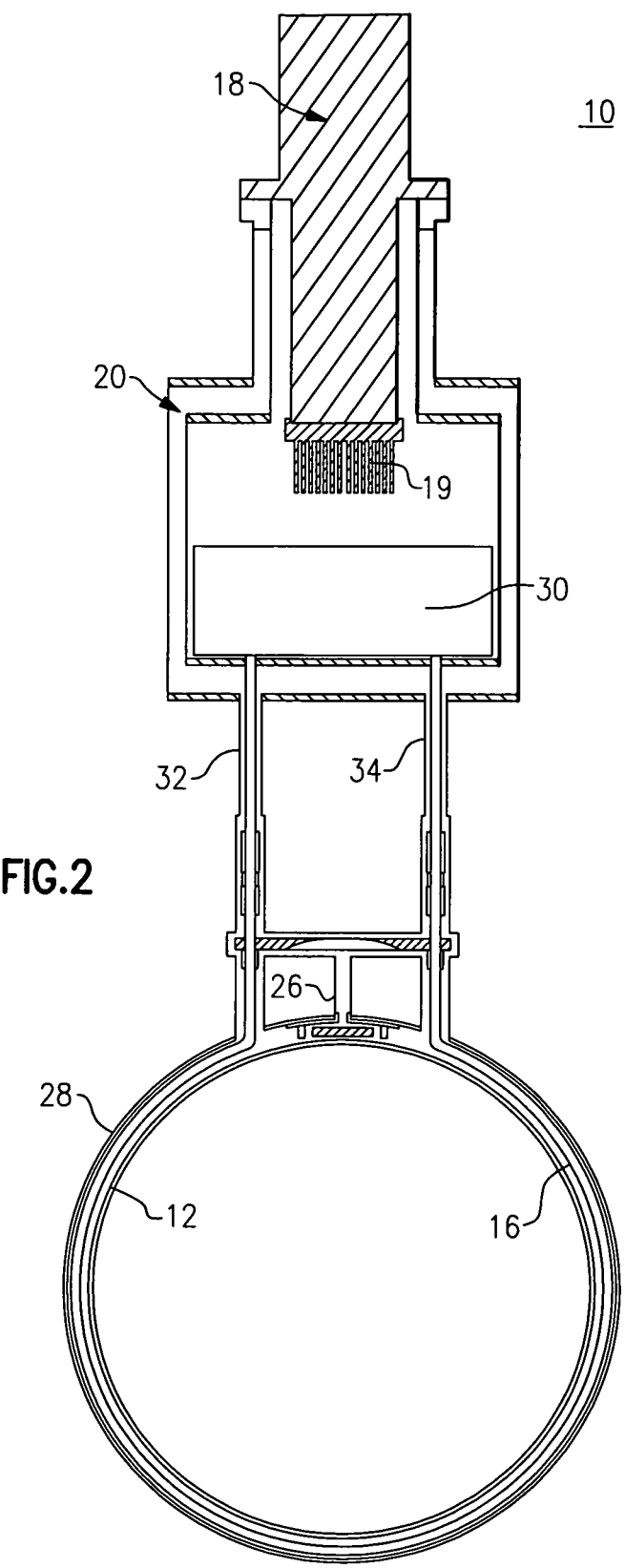
FIG. 2 is a sectional view illustrating cooling portions of the HTS magnet assembly depicted in FIG. 1 in more detail.

FIG. 2 is a sectional view illustrating cooling portions of the HTS magnet assembly 10 depicted in FIG. 1 in more detail. The HTS magnet assembly 10 is depicted in its normal operating position with a single-stage cryocooler 18 at the top of the assembly 10. The cryocooler 18 is attached to a liquid cryogen dewar 20 at its lower end. The cryocooler includes a cryogen recondenser 19 at its lower portion that is disposed internal to the cryogen dewar 20. A supply inventory of liquid cryogen 30 is contained within the liquid cryogen dewar 20, below the cryogen recondenser 19. Cryogen supply and return cooling tubes 32, 34 forming the end portions of a cryogen cooling coil 16 that forms a gravity driven thermo-siphon cooling system of liquid cryogen 30, are bonded to the cryogen dewar 20, and deliver the liquid cryogen 30 to the cooling coil 16 such that the HTS coil 12 is conduction cooled indirectly by nucleate boiling of the liquid cryogen 30. For the illustrated example arrangement, the HTS coil 12 is thermally insulated and mechanically suspended inside the cryostat 28 by a thin cantilever fiber reinforced composite shell 26, attached to the cryostat 28 at one end and to the coil 12 at the other end, as stated above.

Figure 3:
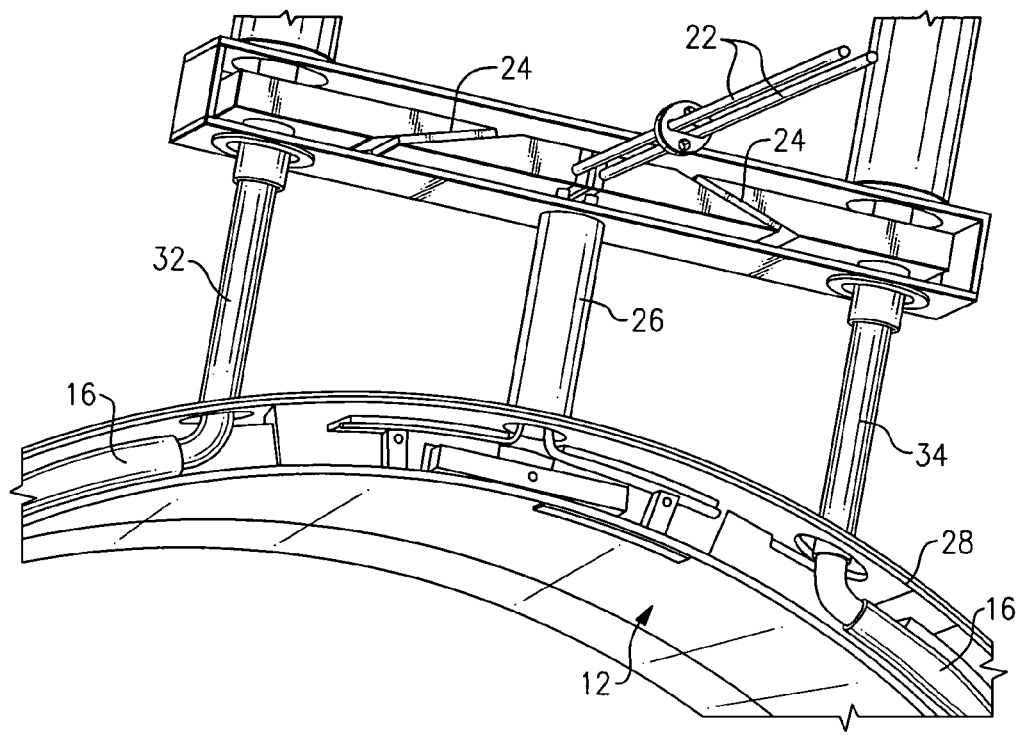
FIG. 3 is a sectional view illustrating power leads of the HTS magnet assembly depicted in FIG. 1 in more detail.

FIG. 3 is a sectional perspective view illustrating power leads 22 of the HTS magnet assembly 10 depicted in FIG. 1 in more detail. For the illustrated example arrangement, the power leads 22 of the HTS coil 12 are heat stationed to the cryogen cooling tubes 32, 34 outside the coil cryostat 28. The HTS coil 12 with the cooling tubes 16, 32, 34 and power leads 22 are all suspended inside cryostat 28 by a thin cantilever fiber reinforced composite shell 26, attached to the cryostat 28 at one end and to the coil 12 at the other end, as stated above.

Figure 4:
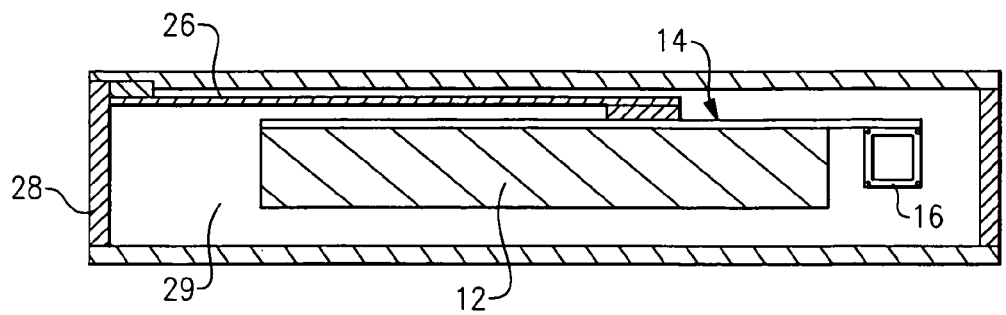
FIG. 4 illustrates the HTS magnet assembly depicted in FIGS. 1 and 2 installed in a vacuum insulated cryostat according to one embodiment of the invention.

FIG. 4 schematically illustrates the HTS magnet assembly 10 depicted in FIGS. 1 and 2 installed in a cryostat 28 that is vacuum insulated 29, according to one embodiment of the invention. In the illustrated embodiment, the HTS magnet assembly 10 can be seen to include an HTS coil 12 having a copper over-wrap heat exchanger 14 attached or bonded thereto. The HTS coil 12 is thermally insulated and mechanically suspended inside the vacuum insulated coil cryostat 28 by a composite thermal support 26 that is attached to the cryostat 28 at one end and to the Cu over-wrap heat exchanger 14 at its other end. A cryogen cooling tube 16 in contact with the copper over-wrap heat exchanger 14 operates to provide indirect thermal conduction cooling of the HTS coil 12 via a boiling liquid cryogen such as Neon contained within the cryogen cooling tube 16. The evaporated cryogen (e.g. Neon) is re-condensed remotely outside the coil cryostat 28 by a cryocooler coldhead 18 discussed above with reference to FIGS. 1 and 2.

In summary explanation, a compact, high temperature superconducting (HTS) magnet has been described in accordance with particular embodiments that comprise an epoxy impregnated HTS coil in a vacuum insulated cryostat, a thermo-siphon cooling system of liquid cryogen, and a supply dewar with a re-condenser cryocooler coldhead. The HTS coil is conduction cooled indirectly by nucleate boiling of liquid cryogen that circulates by a gravity driven thermo-siphon in a cooling tube attached to a copper foil heat exchanger bonded to the outside surface of the HTS coil. The liquid cryogen is supplied to the heat exchanger from an external supply dewar and enters the cooling tube where it cools the HTS coil by boiling heat transfer; and the boiloff vapor returns to the supply dewar where it is re-condensed by a single stage cryocooler coldhead.

Advantages provided by the HTS magnet assembly 10 include 1) elimination of liquid cryogen filled vessels that are large and heavy, as well as 2) a reduction in the liquid cryogen inventory required to cool the HTS magnet by direct boiling, thus eliminating the large and expensive liquid cryogen inventory generally associated with known HTS magnet structures. Further, the HTS magnet assembly is very lightweight and compact, providing a structure that is capable of withstanding high shock and vibration loads, with sufficient storage of cryogens to safely operate through power interruptions and outages, as stated above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high temperature superconducting (HTS) magnet comprising:
    a HTS magnet coil disposed within a cryostat;
    a thermo-siphon cooling system comprising a liquid cryogen, the cooling system configured to indirectly conduction cool the HTS magnet coil by nucleate boiling of the liquid cryogen that is circulated by thermo-siphon in a cooling tube attached to a heat exchanger bonded to the outside surface of the HTS magnet coil; and
    a supply dewar comprising a re-condenser cryocooler coldhead configured to recondense boiloff vapors generated during the nucleate boiling process, wherein the HTS magnet coil and cooling tube are thermally insulated and mechanically suspended inside the cryostat solely via a single horizontal cantilever fiber reinforced composite shell, the cantilever attached to the cryostat at one end and to the HTS magnet coil at its other end.

2. The HTS magnet according to claim 1, wherein the liquid cryogen comprises Neon.

3. The HTS magnet according to claim 1, wherein the HTS magnet coil is epoxy impregnated.

4. The HTS magnet according to claim 1, wherein the cryostat is vacuum insulated.

5. The HTS magnet according to claim 1, wherein the heat exchanger comprises a copper foil.

6. The HTS magnet according to claim 1, wherein the thermo-siphon is gravity driven.

7. The HTS magnet according to claim 1, further comprising HTS coil power leads heat stationed to the cryogen cooling tube outside the cryostat via high conductivity ceramic electrical insulators.

8. A high temperature superconducting (HTS) magnet comprising:
    a HTS magnet coil comprising a heat exchanger bonded thereto, wherein the heat exchanger is further bonded to a thermo-siphon cooling coil;
    a cooling system configured to indirectly conduction cool the HTS coil by nucleate boiling of a liquid cryogen that is circulated to the heat exchanger; and
    a cryocooler coldhead configured to recondense boiloff vapors generated during the nucleate boiling process to generate the boiling liquid cryogen, wherein the HTS magnet coil and thermo-siphon cooling coil are thermally insulated and mechanically suspended inside a cryostat solely via a single horizontal cantilever fiber reinforced composite shell, the cantilever attached to the cryostat at one end and to the HTS magnet coil at its other end.

9. The HTS magnet according to claim 8, wherein the heat exchanger comprises a copper foil.

10. The HTS magnet according to claim 8, the cooling system comprises a gravity driven thermo-siphon in a cooling tube attached to the heat exchanger.

11. The HTS magnet according to claim 8, wherein the liquid cryogen comprises Neon.

12. The HTS magnet according to claim 8, wherein the HTS magnet coil is epoxy impregnated.

13. The HTS magnet according to claim 8, further comprising HTS coil power leads heat stationed to a cryogen cooling tube outside the cryostat via high conductivity ceramic electrical insulators.

* * * * *